(12) United States Patent
De Luna

(10) Patent No.: US 9,845,746 B2
(45) Date of Patent: Dec. 19, 2017

(54) INTERNAL COMBUSTION ENGINE PROVIDED WITH A SELECTIVE CATALYTIC REDUCTION SYSTEM

(71) Applicant: GM GLOBAL TECHNOLOGY OPERATIONS LLC, Detroit, MI (US)

(72) Inventor: Marco De Luna, Turin (IT)

(73) Assignee: GM GLOBAL TECHNOLOGY OPERATIONS LLC, Detroit (*) Notice: Subject to any disclaimer, the term of this patent is extended or adjusted under 35 U.S.C. 154(b) by 0 days.

(21) Appl. No.: 14/942,194

(22) Filed: Nov. 16, 2015

(65) Prior Publication Data
US 2016/0138498 A1 May 19, 2016

(30) Foreign Application Priority Data
Nov. 15, 2014 (DE) .................... 20 2014 009 073 U

(51) Int. Cl.
| | | |
|---|---|---|
| F01N 3/00 | (2006.01) | |
| F02D 41/00 | (2006.01) | |
| F02D 21/08 | (2006.01) | |
| F01N 3/20 | (2006.01) | |
| F02D 41/02 | (2006.01) | |

(52) U.S. Cl.
CPC ......... *F02D 41/0052* (2013.01); *F01N 3/208* (2013.01); *F02D 21/08* (2013.01); *F02D 41/005* (2013.01); *F02D 41/0047* (2013.01); *F02D 41/0235* (2013.01); *F01N 2610/02* (2013.01); *F01N 2900/0601* (2013.01); *F01N 2900/1404* (2013.01); *F01N 2900/1602* (2013.01); *F01N 2900/1622* (2013.01);
(Continued)

(58) Field of Classification Search
USPC ......... 60/274, 278, 276, 286, 295, 297, 301, 60/303
See application file for complete search history.

(56) References Cited

U.S. PATENT DOCUMENTS 8,240,136 B2 * 8/2012 Kurtz .................... F01N 3/035
60/286
8,448,428 B2 * 5/2013 Hirota .................. F01N 3/2006
60/286
(Continued)

FOREIGN PATENT DOCUMENTS

DE 102006007122 A1 8/2007

OTHER PUBLICATIONS

German Patent Office, German Search Report for German Application No. 202014009073.4, dated Feb. 24, 2015.

*Primary Examiner* — Binh Q Tran
(74) *Attorney, Agent, or Firm* — Lorenz & Kopf, LLP

(57) ABSTRACT

An internal combustion engine (ICE) and method of control are provided to determine a value of a catalyst temperature and a value of a quantity of a reducing agent stored in the catalyst. The quantity of gas recirculated by an exhaust gas recirculation (EGR) system of the ICE is calculated on the basis of the value of the catalyst temperature and of the value of the quantity of the reducing agent stored in the catalyst. This solution makes it possible to adjust the quantity of gas recirculated by the EGR system on the basis of parameters linked to an efficiency of a selective catalytic reduction (SCR) system associated with the ICE, in order to reduce the global quantity of pollutants produced by the ICE and released in the environment.

15 Claims, 2 Drawing Sheets

(52) U.S. Cl.
CPC ....... *F02D 2200/0802* (2013.01); *Y02T 10/24* (2013.01); *Y02T 10/47* (2013.01)

(56) References Cited

U.S. PATENT DOCUMENTS

| | | | |
|---|---|---|---|
| 8,596,042 B2* | 12/2013 | Parmentier | F01N 3/208 60/275 |
| 8,800,274 B2* | 8/2014 | Sun | F02D 41/0275 60/274 |
| 8,943,802 B2* | 2/2015 | Kawaguchi | F01N 3/2013 60/278 |
| 2013/0261930 A1 | 10/2013 | Kurtz et al. | |

* cited by examiner ous applications.

INTERNAL COMBUSTION ENGINE PROVIDED WITH A SELECTIVE CATALYTIC REDUCTION SYSTEM

CROSS-REFERENCE TO RELATED APPLICATION

This application claims priority to German Patent Application No. 202014009073.4, filed Nov. 15, 2014, which is incorporated herein by reference in its entirety.

TECHNICAL FIELD

The present disclosure pertains to an internal combustion engine provided with a selective catalytic reduction (SCR) system and with an exhaust gas recirculation (EGR) system.

BACKGROUND

It is known that modern internal combustion engines (ICE) include after treatment devices, such as diesel oxidation catalysts (DOC) and Diesel particulate filters (DPF), which are disposed in an exhaust pipe of the ICE to change the composition of the exhaust gases, thereby reducing the polluting emissions. Some ICE may also include a selective catalytic reduction (SCR) system and an EGR system, both of which are generally provided for reducing the content of nitrogen oxides. The SCR system usually includes a catalyst disposed in the exhaust pipe of the ICE and an injector of a reducing agent located upstream of the catalyst. In this way, the injected reducing agent is stored inside the catalyst, where it is used to convert nitrogen oxides into diatomic nitrogen and water.

The EGR system usually includes an EGR conduit that fluidly connects the exhaust gas pipe with the intake pipe of the ICE, in order to recirculate part of the exhaust gases back into the combustion chambers. In this way, the recirculated exhaust gases are able to reduce the combustion temperature and thus the nitrogen oxides produced by the ICE. While significantly reducing the quantity of nitrogen oxides, the recirculation of exhaust gas has the side effect of increasing the amount of soot and smoke emitted by the ICE, which is not only harmful for the environment but it may also bring to more frequent regeneration of the particulate filter.

For this reason, the quantity of exhaust gas routed back to the intake pipe is regulated by means of an EGR valve, which is disposed in the EGR conduit and which is connected to an electronic control unit (ECU). More particularly, the electronic control unit (ECU) is configured to regulate the quantity of exhaust gas recirculated by the EGR system by determining a set point of the air mass flow rate necessary to operate the engine, and by controlling the EGR valve in order to reach the set point. The set point of the air mass flow rate is conventionally determined on the basis of several parameters that are linked to the engine cycle (e.g. the engine speed, the injected fuel quantity, the gear, etc.).

However, with these parameters, the quantity of gas recirculated by the EGR system cannot be always adjusted to optimize the overall performance of the ICE (seen as a system that also includes other exhaust treatment devices like the SCR system), in order to reduce the global emission of pollutants. In particular, it is not always possible to adjust the quantity of gas recirculated by the EGR system in order to reach an effective compromise between the quantities of nitrogen oxides released in the environment and the smoke and soot produced by the ICE.

SUMMARY

The present disclosure provides an internal combustion engine where the quantity of gas recirculated by the EGR system may be adjusted to reduce the global quantity of pollutants produced by the ICE and released in the environment. In addition, the present disclosure provides an internal combustion engine where the quantity of gas recirculated by the EGR may be controlled in order to significantly reduce the production of soot and smoke without increasing, or with only a negligible increase, of the amount of nitrogen oxides released in the environment. The present disclosure also provides an internal combustion engine that requires less frequent regeneration of the particulate filter.

In particular, an embodiment of the present disclosure relates to an internal combustion engine provided with a selective catalytic reduction system including a catalyst, an exhaust gas recirculation system and an electronic control unit that is configured to determine a value of a catalyst temperature and determine a value of a quantity of a reducing agent stored in the catalyst. The quantity of gas recirculated by the exhaust gas recirculation system is calculated on the basis of the value of the catalyst temperature and of the value of the quantity of the reducing agent stored in the catalyst. This solution makes it possible to adjust the quantity of gas recirculated by the EGR system on the basis of parameters linked to SCR efficiency, in order to reduce the global quantity of pollutants produced by the ICE and released sin the environment.

According to an aspect of the present disclosure, the electronic control unit is configured to determine a set point of an air mass flow rate required by the engine on the basis of the value of the catalyst temperature and of the value of the quantity of the reducing agent stored in the catalyst. The quantity of gas recirculated by the exhaust gas recirculation system is adjusted on the basis of the set point of the air mass flow rate. This aspect of the present disclosure has the advantage of providing a simple way to control the quantity of gas recirculated by the EGR system, which perfectly integrates with protocols already implemented in exiting ECUs.

According to another aspect of the present disclosure, the electronic control unit is configured to determine a base value of the set-point of the air mass flow rate on the basis of an engine speed value and of a fuel quantity value and determine a contribution value to the set-point of the air mass flow rate on the basis of the value of the catalyst temperature and of the value of the quantity of the reducing agent stored in the catalyst. The set point of the air mass flow rate is calculated by adding the base value to the contribution value. This aspect of the present disclosure is a simple and effective way to determine a set point of the air mass flow, based on information already used by the ECU to operate the ICE.

According to another aspect of the present disclosure, the electronic control unit is configured to determine the base value from a first map correlating the engine speed value to the fuel quantity value. This aspect of the present disclosure offers a simple way to obtain a base value of the air mass flow rate, which conforms to different operating conditions of the ICE.

According to another aspect of the present disclosure, the electronic control unit is configured to determine a first correction factor value from a second map correlating the value of the catalyst temperature to the value of the quantity of the reducing agent stored in the catalyst, and determine a second correction factor value from a third map correlating the engine speed value to the fuel quantity value. The contribution value is calculated by multiplying the first correction factor value and the second correction factor value. This aspect of the present disclosure makes it possible to calculate in a simple and reliable way a contribution value that reflects the operating conditions of the ICE.

According to still another aspect of the present disclosure, the electronic control unit is configured to select a dosing strategy for determining a value of a reducing agent quantity to be injected upstream of the catalyst, and set the contribution value to zero if the dosing strategy is different from a pre-determined dosing strategy. This aspect of the present disclosure makes it possible reduce the global amount of pollutant produced by the ICE and released the environment by modifying the operating conditions of the ICE, only if this reduction do not compromise the overall performance of the ICE.

According to another aspect of the present disclosure the electronic control unit is configured to select the dosing strategy among a first dosing strategy providing for injecting a reducing agent quantity value to convert all the nitrogen oxides entering the selective catalytic reduction system, a second dosing strategy providing for injecting a reducing agent quantity value to convert a partial quantity of the nitrogen oxides entering the selective catalytic reduction system, or a third dosing strategy providing for not injecting a reducing agent quantity value. This aspect of the present disclosure makes it available a number of effective dosing strategies of the reducing agent, which are linked to different ICE operating conditions.

According to another aspect of the present disclosure, the electronic control unit is configured to assume the first dosing strategy as the predetermined dosing strategy. This aspect of the present disclosure provides a simple and easy way to identify an operating condition of the ICE when it is necessary to reduce the quantity of pollutants produced by the ICE and released in the environment.

According to still another aspect of the present disclosure, the electronic control unit is configured to determine the value of the catalyst temperature with a temperature sensor coupled to the catalyst. This aspect of the present disclosure provides an effective and precise way to obtain the temperature of the catalyst.

According to again another aspect of the present disclosure, the electronic control unit is configured to determine the value of the catalyst temperature from an estimation on the basis of a value of a gas exhaust temperature. This aspect of the present disclosure provides an inexpensive and simple way to obtain the catalyst temperature using sensors already present in the ICE.

Another embodiment of the present disclosure relates to a method of operating an internal combustion engine provided with a selective catalytic reduction system including a catalyst, and ad exhaust gas recirculation system, the method including determining a value of a catalyst temperature, determining a value of a quantity of a reducing agent stored in the catalyst, and adjusting the quantity of gas recirculated by the exhaust gas recirculation system on the basis of the value of the catalyst temperature and of the value of the quantity of the reducing agent stored in the catalyst. This solution makes it possible to adjust the quantity of gas recirculated by the EGR system on the basis of parameters linked to SCR efficiency, in order to reduce the global quantity of pollutants produced by the ICE and released sin the environment.

According to an aspect of the present disclosure, the method includes determining a set-point of an air mass flow rate required by the engine on the basis of the value of the catalyst temperature and of the value of the quantity of the reducing agent stored in the catalyst, and adjusting the quantity of gas recirculated by the exhaust gas recirculation system on the basis of the set-point of the air mass flow rate. This aspect of the present disclosure has the advantage of providing a simple way to control the quantity of gas recirculated by the EGR system, which perfectly integrates with protocols already implemented in exiting ECUs.

According to another aspect of the present disclosure, the method includes determining a base value of the set-point of the air mass flow rate on the basis of an engine speed value and of a fuel quantity value, determining a contribution value to the set-point of the air mass flow rate on the basis of the value of the catalyst temperature and of the value of the quantity of the reducing agent stored in the catalyst, and calculating the set-point of the air mass flow rate by adding the base value to the contribution value. This aspect of the present disclosure is a simple and effective way to determine a set point of the air mass flow, based on information already used by the ECU to operate the ICE.

According to another aspect of the present disclosure, the method includes determining the base value from a first map correlating the engine speed value to the fuel quantity value. This aspect of the present disclosure offers a simple way to obtain a base value of the air mass flow rate, which conforms to different operating conditions of the ICE.

According to another aspect of the present disclosure, the method includes determining a first correction factor value from a second map correlating the value of the catalyst temperature to the value of the quantity of the reducing agent stored in the catalyst, determining a second correction factor value from a third map correlating the engine speed value to the fuel quantity value, and calculating the contribution value by multiplying the first correction factor value and the second correction factor value. This aspect of the present disclosure makes it possible to calculate in a simple and reliable way a contribution value that reflects the operating conditions of the ICE.

According to still another aspect of the present disclosure, the electronic control unit is configured to select a dosing strategy for determining a value of a reducing agent quantity to be injected upstream of the catalyst, and set the contribution value to zero if the dosing strategy is different from a pre-determined dosing strategy. This aspect of the present disclosure makes it possible reduce the global amount of pollutant produced by the ICE and released the environment by modifying the operating conditions of the ICE, only if this reduction do not compromise the overall performance of the ICE.

According to another aspect of the present disclosure, the method includes selecting the dosing strategy among a first dosing strategy providing for injecting a reducing agent quantity value to convert all the nitrogen oxides entering the selective catalytic reduction system, a second dosing strategy providing for injecting a reducing agent quantity value to convert a partial quantity of the nitrogen oxides entering the selective catalytic reduction system, and a third dosing strategy providing for not injecting a reducing agent quantity value. This aspect of the present disclosure makes it available a number of effective dosing strategies of the reducing agent, which are linked to different ICE operating conditions.

According to another aspect of the present disclosure, the method includes assuming the first dosing strategy as the predetermined dosing strategy. This aspect of the present disclosure provides a simple and easy way to identify an operating condition of the ICE when it is necessary to reduce the quantity of pollutants produced by the ICE and released in the environment.

According to still another aspect of the present disclosure, the method includes determining the value of the catalyst temperature by means of a temperature sensor coupled to the catalyst. This aspect of the present disclosure provides an effective and precise way to obtain the temperature of the catalyst.

According to again another aspect of the present disclosure, the method includes determining the value of the catalyst temperature by means of an estimation on the basis of a value of a gas exhaust temperature. This aspect of the present disclosure provides an inexpensive and simple way to obtain the catalyst temperature using sensors already present in the ICE.

In particular, an embodiment of the present disclosure relates to an internal combustion engine provided with a selective catalytic reduction system including a catalyst, an exhaust gas recirculation system and an electronic control unit configured to determine a value of a catalyst temperature, determine a value of a quantity of a reducing agent stored in the catalyst, and adjust the quantity of gas recirculated by the exhaust gas recirculation system on the basis of the value of the catalyst temperature and of the value of the quantity of the reducing agent stored in the catalyst. This solution makes it possible to adjust the quantity of gas recirculated by the EGR system on the basis of parameters linked to SCR efficiency, in order to reduce the global quantity of pollutants produced by the ICE and released sin the environment.

According to an aspect of the present disclosure, the internal combustion engine includes an electronic control unit is configured to determine a set-point of an air mass flow rate required by the engine on the basis of the value of the catalyst temperature and of the value of the quantity of the reducing agent stored in the catalyst, and adjust the quantity of gas recirculated by the exhaust gas recirculation system on the basis of the set-point of the air mass flow rate. This aspect of the present disclosure has the advantage of providing a simple way to control the quantity of gas recirculated by the EGR system, which perfectly integrates with protocols already implemented in exiting ECUs.

According to another aspect of the present disclosure, the internal combustion engine includes an electronic control unit is configured to determine a base value of the set-point of the air mass flow rate on the basis of an engine speed value and of a fuel quantity value, determine a contribution value to the set-point of the air mass flow rate on the basis of the value of the catalyst temperature and of the value of the quantity of the reducing agent stored in the catalyst, and calculate the set-point of the air mass flow rate by adding the base value to the contribution value. This aspect of the present disclosure is a simple and effective way to determine a set point of the air mass flow, based on information already used by the ECU to operate the ICE.

According to another aspect of the present disclosure, the internal combustion engine includes an electronic control unit is configured to determine the base value from a first map correlating the engine speed value to the fuel quantity value. This aspect of the present disclosure offers a simple way to obtain a base value of the air mass flow rate, which conforms to different operating conditions of the ICE.

According to another aspect of the present disclosure, the internal combustion engine includes an electronic control unit configured to determine a first correction factor value from a second map correlating the value of the catalyst temperature to the value of the quantity of the reducing agent stored in the catalyst, determine a second correction factor value from a third map correlating the engine speed value to the fuel quantity value, and calculate the contribution value by multiplying the first correction factor value and the second correction factor value. This aspect of the present disclosure makes it possible to calculate in a simple and reliable way a contribution value that reflects the operating conditions of the ICE.

According to still another aspect of the present disclosure, the internal combustion engine includes an electronic control unit configured to select a dosing strategy for determining a value of a reducing agent quantity to be injected upstream of the catalyst, and set the contribution value to zero if the dosing strategy is different from a pre-determined dosing strategy. This aspect of the present disclosure makes it possible reduce the global amount of pollutant produced by the ICE and released the environment by modifying the operating conditions of the ICE, only if this reduction do not compromise the overall performance of the ICE.

According to another aspect of the present disclosure the internal combustion engine includes means to select the dosing strategy among a first dosing strategy providing for injecting a reducing agent quantity value to convert all the nitrogen oxides entering the selective catalytic reduction system, a second dosing strategy providing for injecting a reducing agent quantity value to convert a partial quantity of the nitrogen oxides entering the selective catalytic reduction system, or a third dosing strategy providing for not injecting a reducing agent quantity value. This aspect of the present disclosure makes it available a number of effective dosing strategies of the reducing agent, which are linked to different ICE operating conditions.

According to another aspect of the present disclosure, the internal combustion engine includes an electronic control unit configured to assume the first dosing strategy as the predetermined dosing strategy. This aspect of the present disclosure provides a simple and easy way to identify an operating condition of the ICE when it is necessary to reduce the quantity of pollutants produced by the ICE and released in the environment.

According to still another aspect of the present disclosure, the internal combustion engine includes an electronic control unit configured to determine the value of the catalyst temperature by a temperature sensor coupled to the catalyst. This aspect of the present disclosure provides an effective and precise way to obtain the temperature of the catalyst.

According to again another aspect of the present disclosure, the internal combustion engine includes an electronic control unit configured to determine the value of the catalyst temperature estimating it on the basis of a value of a gas exhaust temperature. This aspect of the present disclosure provides an inexpensive and simple way to obtain the catalyst temperature using sensors already present in the ICE.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
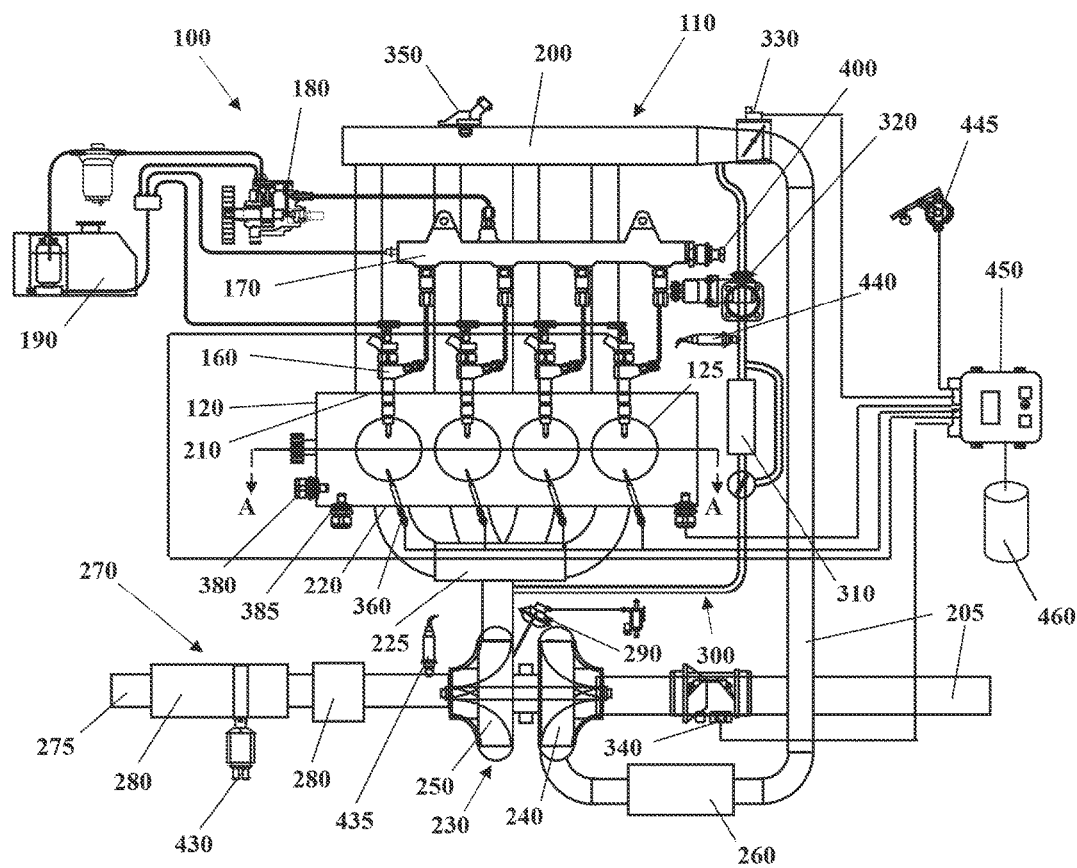
FIG. 1 schematically shows an automotive system according to an embodiment of the present disclosure.
Figure 2:
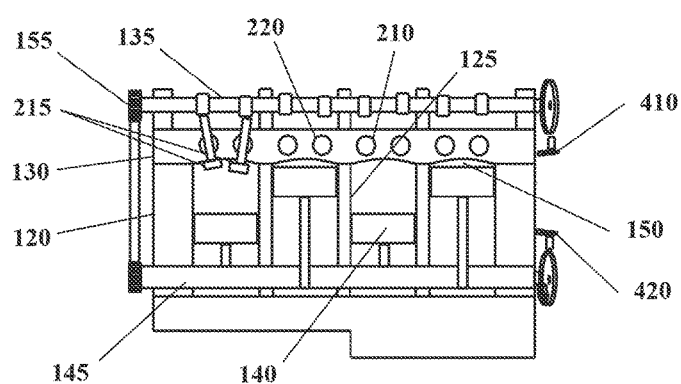
FIG. 2 is a cross section taken along A-A of an internal combustion engine belonging to the automotive system shown in FIG. 1.

Some embodiments may include an automotive system 100, as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 and the air through at least one intake port 210. The fuel is provided at high pressure to the fuel injector 160 from a fuel rail 170 in fluid communication with a high-pressure fuel pump 180 that increase the pressure of the fuel received from a fuel source 190. Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust after treatment devices 280. The after treatment devices may be any device configured to change the composition of the exhaust gases. Some examples of after treatment devices 280 include, but are not limited to, catalytic converters (two and three way), oxidation catalysts, lean NOx traps, hydrocarbon adsorbers, selective catalytic reduction (SCR) systems, and particulate filters.

Figure 3:
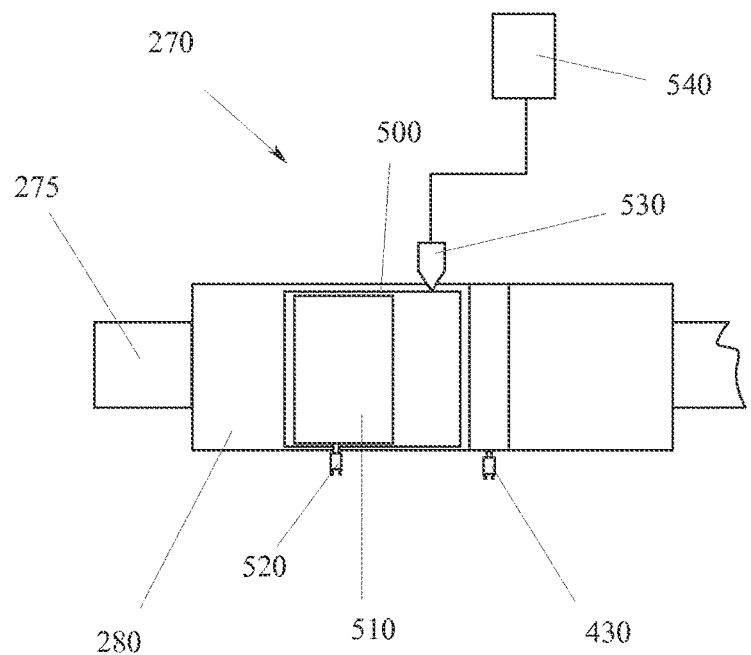
FIG. 3 is a schematic view of a part of the exhaust system of the internal combustion engine.

FIG. 3 shows the SCR system 500 in detail, which includes a SCR catalyst 510 disposed in the exhaust pipe 275 downstream of a reducing agent injector 530. The reducing agent injector 530 is provided for injecting into the exhaust pipe 275 a diesel exhaust fluid (DEF), for example urea, stored in a reducing agent tank 540. Once injected the reducing agent mixes with the exhaust gases and is converted thereby into a gaseous reducing agent (e.g. ammonia). This gaseous reducing agent is stored inside the SCR catalyst 510, thereby prompting the reduction of the nitrogen oxides (NOx) contained in the exhaust gases into diatonic nitrogen (N2) and water (H2O). Since the reducing agent injector 510 is exposed to the exhaust gas stream, it may be arranged in thermal exchange relation with a dedicated cooler provided for reducing its temperature.

Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant temperature and level sensors 385, oil temperature and level sensors 380, a fuel rail pressure sensor 400, a cam position sensor 410, a crank position sensor 420, lambda sensor 435, exhaust pressure and temperature sensors 430, an EGR temperature sensor 440, and an accelerator pedal position sensor 445, a catalyst temperature sensor 520.

Furthermore, the ECU 450 may generate output signals to various control devices that are arranged to control the operation of the ICE 110, including, but not limited to, the fuel injectors 160, the throttle body 330, the EGR Valve 320, the VGT actuator 290, and the cam phaser 155. Note, dashed lines are used to indicate communication between the ECU 450 and the various sensors and devices, but some are omitted for clarity.

With particular focus on the ECU 450, this apparatus may include a digital central processing unit (CPU) in communication with a memory system and an interface bus. The CPU is configured to execute instructions stored as a program in the memory system 460, and to send and receive signals to/from the interface bus. The memory system 460 may include various storage types including optical storage, magnetic storage, solid-state storage, and other non-volatile memory. The interface bus may be configured to send, receive, and modulate and/or digital signals to/from the various sensors and control devices. The program may embody the methods disclosed herein, allowing the CPU to carryout the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier. The carrier may be transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing said computer program code is impressed on the transitory electromagnetic signal. Such signals are e.g. made use of when transmitting computer program code in a wireless fashion via a WiFi connection to a laptop.

In case of a non-transitory computer program product, the computer program code is embodied in a tangible storage medium. The storage medium is then the non-transitory carrier mentioned above, such that the computer program code is permanently or non-permanently stored in a retrievable way in or on this storage medium such that it constitutes a non-transitory computer readable medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle, which shall be considered equivalent to the ECU 450.

Figure 4:
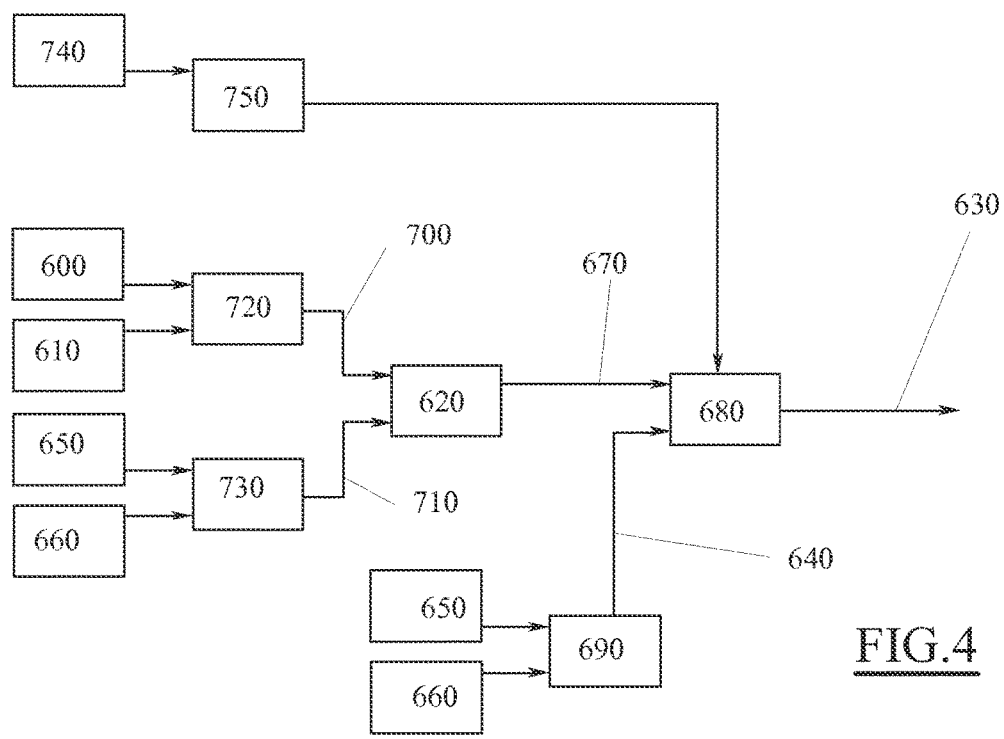
FIG. 4 is a block diagram illustrating a control strategy of the EGR system.

FIG. 4 shows a block diagram illustrating a control strategy of the EGR system 300, and in particular of a control performed by the ECU 450 on the EGR valve 320 in order adjust the quantity of gas recirculated by the EGR 300. The ECU may control the EGR valve 320 using a set point 630 of an air mass flow rate required by the engine. More specifically, the ECU 450 may determine the set-point 630 of the air mass flow rate and it may adjust the EGR valve 320 to reach the set-point, thus regulating the quantity of gas recirculated by the exhaust gas recirculation system 300.

The set point for the air mass flow rate may be calculated by adding (block 680) a base value 640 of the air mass flow rate to a contribution value 670 of air mass flow rate. The base value 640 may be determined on the basis of an engine speed value 650 and of a fuel quantity value 660, while the contribution value 670 may be determined on the basis of the value of the catalyst temperature 600 and of the value of the quantity of the reducing agent 610 stored in the catalyst. It is to be noted, that the base value 640 of the air mass flow rate is the one required by the engine cycle, and it depends on the different working conditions of the ICE (engine speed value/fuel quantity value). For this reason, the base value 640 of the set-point of the air mass flow may be calculated in a conventional way, for example with the help of a first map 690 correlating the engine speed value 650 and the fuel quantity value 660 to a correspondent base value 640.

The contribution value 670 may be determined by multiplying (block 620) the value of a first correction factor 700 with the value of a second correction factor 710. The value of the first correction factor 700 is determined by a second map 720 having as input the catalyst temperature 600 and the value of the quantity 610 of a reducing agent stored in the catalyst 510. These values are used to assess the catalyst efficiency in converting nitrogen oxides. In order to determine the input for the second map 720, the ECU 450 may measure the value of a catalyst temperature 600 from the sensor 520 coupled to the catalyst 510 or may estimate such temperature on the basis of a value of a gas exhaust temperature. In this latter case, the value of the gas exhaust temperature may be measured by means of the exhaust temperature sensor 430.

The ECU 450 may also determine the value of the quantity 610 of a reducing agent stored in the catalyst 510 on the basis of the quantity nitrogen oxides entering the selective catalytic reduction system and on the basis of a quantity of reducing agent injected by the reducing agent injector 530. It is possible to measure the quantity of nitrogen oxides entering the selective catalytic reduction system by means of a dedicated sensor, or it is also possible to estimate it. The second correction factor 710 derives from a third map 730 that uses the engine speed 650 and the fuel quantity 660 as input. The set point 630, calculated as explained above, is finally used to control the quantity of exhaust gas recirculated by the EGR system.

In should be highlighted that the control unit 450 may calculate the contribution value 670 as described above, only when a pre-determined dosing strategy is used to inject the reducing agent quantity upstream of the catalyst 510. Otherwise, if the dosing strategy 740 according to which the ICE is currently operating is different from the pre-determined one, the control unit 450 may set the contribution value 670 to zero. In this case the set point of the air mass flow rate 630 corresponds to the base value 640 and the ICE operates conventionally.

The ECU 450 may perform the above-described check using an activation map 750 that receives as input the dosing strategy 740 according to which the ICE is currently operating. By way of example, the ECU 450 may select a dosing strategy 740, among: a first dosing strategy providing for injecting a reducing agent quantity value to convert all the nitrogen oxides entering the selective catalytic reduction system 500 and to reach a pre-set value of quantity the reducing agent stored in the catalyst 500, that may be used for example during urban cycle; a second dosing strategy providing for injecting a reducing agent quantity value proportional to the nitrogen oxides entering the selective catalytic reduction system 500, that may be used during extra-urban cycle; or a third dosing strategy providing for not injecting a reducing agent quantity value, that may be used when it is necessary to empty the catalyst from reducing agent. In this case, the pre-determined dosing strategy may be for example the first dosing strategy.

Therefore, if the ECU 450 is operating the ICE 110 according to the first dosing strategy, the contribution value 670 may be calculated with the second and the third map 720 and 730, otherwise the contribution value 670 is set equal to zero. A numeric example may be of help in understanding the functioning of the ICE 110.

The ECU 450 may determine, in certain operating conditions, that the value of the catalyst temperature is 220° C. and the value of the quantity of a reducing agent stored in the catalyst is 1 g. In these conditions, the efficiency of the SCR system 500 is 90%, i.e. that the catalyst 610 can convert 90% of the nitrogen oxides entering it. With a base value 640 of the air mass flow rate of 280 mg/cycle, and with a contribution value 670 set to zero (the dosing strategy is different from the first one), the set-point 630 of the air mass flow rate is 280 mg/cycle. This operating condition is the same of a conventional engine. With this air mass flow rate, the quantity of nitrogen oxides entering the catalyst is 65 ppm, and the smoke produced by ICE at the exit of the exhaust manifold is 1.7 FSN (filter smoke number). The quantity of nitrogen oxides released in the environment is 6 ppm.

When the ECU 450 operates the ICE 110 according to the first dosing strategy (that is aimed to convert the entire amount of the nitrogen oxides entering the selective catalytic reduction system), the contribution values becomes 60 mg/cycle. Therefore, the set point of the air mass flow becomes 340 mg/cycle. In order to obtain this set point, the ECU 450 closes the EGR valve 320 thereby reducing the quantity of exhaust gas recirculated by the EGR system 300. This increases up to 85 ppm the quantity of nitrogen oxides entering the SCR catalyst 510, but the reduced amount of exhaust gas recirculated by the EGR system reduces to 1.0 FSN the smoke present at the exit of the exhaust manifold 200. The nitrogen oxides released in the environment are 8 ppm. The increase of production of nitrogen oxides after the catalyst 510 is negligible if compared to the big decrease of soot loading (−40%).

The above example shows that in some conditions when the SCR catalyst 510 has an high efficiency, it is possible to reduce the quantity of exhaust gas recirculated by the EGR system 300 in function of the SCR efficiency, in order to significantly reduce the production of smoke and soot, with only a negligible or null increase of nitrogen oxides released in the environment. The above result is obtained by adjusting the quantity of gas recirculated by the exhaust gas recirculation system 300 on the basis of the value of the catalyst temperature 600 and of the value of the quantity of the reducing agent stored in the catalyst 610.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An internal combustion engine comprises a selective catalytic reduction system having a catalyst, an exhaust gas recirculation system and an electronic control unit configured to:
   determine a value of a catalyst temperature;
   determine a value of a quantity of a reducing agent stored in the catalyst;
   determine a set point of an air mass flow rate required by the engine on the basis of the value of the catalyst temperature and of the value of the quantity of the reducing agent stored in the catalyst;
   determine a base value of the set point of the air mass flow rate on the basis of an engine speed value and of a fuel quantity value;
   determine a contribution value to the set point of the air mass flow rate on the basis of the value of the catalyst temperature and of the value of the quantity of the reducing agent stored in the catalyst;
   calculate the set point of the air mass flow rate by adding the base value to the contribution value; and
   adjust the quantity of gas recirculated by the exhaust gas recirculation system on the basis of the value of the catalyst temperature, the value of the quantity of the reducing agent stored in the catalyst, and the set point of the air mass flow rate.

2. The internal combustion engine according to claim 1, wherein the electronic control unit is further configured to determine the base value from a first map correlating the engine speed value to the fuel quantity value.

3. The internal combustion engine according to claim 2, wherein the electronic control unit is further configured to:
   determine a first correction factor value from a second map correlating the value of the catalyst temperature to the value of the quantity of the reducing agent stored in the catalyst;
   determine a second correction factor value from a third map correlating the engine speed value (650) to the fuel quantity value; and
   calculate the contribution value by multiplying the first correction factor value and the second correction factor value.

4. The internal combustion engine according to claim 1, wherein the electronic control unit is further configured to:
   select a dosing strategy for determining a value of a reducing agent quantity to be injected upstream of the catalyst; and
   set the contribution value to zero when the dosing strategy is different from a pre-determined dosing strategy.

5. The internal combustion engine according to claim 4, wherein the electronic control unit is further configured to select the dosing strategy from the group consisting of:
   a first dosing strategy providing for injecting a reducing agent quantity value to convert all the nitrogen oxides entering the selective catalytic reduction system;
   a second dosing strategy providing for injecting a reducing agent quantity value proportional to the nitrogen oxides entering the selective catalytic reduction system; and
   a third dosing strategy providing for not injecting a reducing agent quantity value.

6. The internal combustion engine according to claim 5, wherein the electronic control unit is configured to assume the first dosing strategy as the predetermined dosing strategy.

7. The internal combustion engine according to claim 1, further comprising a temperature sensor coupled to the catalyst, wherein the electronic control unit is further configured to determine the value of the catalyst temperature.

8. The internal combustion engine according to claim 1, wherein the electronic control unit is further configured to estimate the catalyst temperature on the basis of a value of a gas exhaust temperature.

9. A method for controlling an internal combustion engine including a selective catalytic reduction system having a catalyst and an exhaust gas recirculation system, the method comprising:
   determining, in a processor, a value of a catalyst temperature;
   determining, in the processor, a value of a quantity of a reducing agent stored in the catalyst;
   determining, in the processor, a set point of an air mass flow rate required by the engine on the basis of the value of the catalyst temperature and of the value of the quantity of the reducing agent stored in the catalyst;
   determining, in the processor, a base value of the set point of the air mass flow rate on the basis of an engine speed value and of a fuel quantity value;
   determining, in the processor, a contribution value to the set point of the air mass flow rate on the basis of the value of the catalyst temperature and of the value of the quantity of the reducing agent stored in the catalyst;
   calculating, in the processor, the set point of the air mass flow rate by adding the base value to the contribution value; and
   adjusting the quantity of gas recirculated by the exhaust gas recirculation system on the basis of the value of the catalyst temperature, the value of the quantity of the reducing agent stored in the catalyst, and the set point of the air mass flow rate.

10. The method according to claim 9, further comprising determining, in the processor, the base value from a first map correlating the engine speed value to the fuel quantity value.

11. The method according to claim 10, further comprising:
   determining, in the processor, a first correction factor value from a second map correlating the value of the catalyst temperature to the value of the quantity of the reducing agent stored in the catalyst;
   determining, in the processor, a second correction factor value from a third map correlating the engine speed value to the fuel quantity value; and
   calculating, in the processor, the contribution value by multiplying the first correction factor value and the second correction factor value.

12. The method according to claim 9, wherein further comprising:
   selecting a dosing strategy for determining a value of a reducing agent quantity to be injected upstream of the catalyst; and
   setting the contribution value to zero when the dosing strategy is different from a pre-determined dosing strategy.

13. The method according to claim 12, wherein selecting the dosing strategy comprises selecting from the group consisting of:
   a first dosing strategy providing for injecting a reducing agent quantity value to convert all the nitrogen oxides entering the selective catalytic reduction system;
   a second dosing strategy providing for injecting a reducing agent quantity value proportional to the nitrogen oxides entering the selective catalytic reduction system; and
   a third dosing strategy providing for not injecting a reducing agent quantity value.

14. The method according to claim 13, further comprising assuming the first dosing strategy as the predetermined dosing strategy.

15. The method according to claim 9, further comprising estimating the catalyst temperature on the basis of a value of a gas exhaust temperature.

* * * * *